3,394,146
TRITHIONE PRODUCTION
Russell L. Hodgson, Walnut Creek, and Edgar J. Smutny, San Francisco, Calif., assignors to Shell Oil Company, New York, N.Y., a corporation of Delaware
No Drawing. Filed Feb. 21, 1966, Ser. No. 528,839
9 Claims. (Cl. 260—327)

ABSTRACT OF THE DISCLOSURE

An improved process of producing certain 4-substituted trithiones by contacting elemental sulfur and the correspondingly-2-substituted propene or propane at elevated temperature for a short contact time.

---

This invention relates to an improved method of producing certain 4-substituted trithiones.

Alternate methods are availabe in the art for the production of 1,2-diethiole-3-thiones, herein termed trithiones. These compounds are heterocyclic in character containing two adjacent atoms of sulfur and three atoms of carbon in a five-membered, unsaturated ring. The class of trithiones is generically represented by the formula

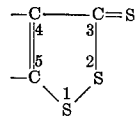

wherein the added numerals indicate the conventional manner of numbering the ring atoms. In general, conventional methods of producing trithiones comprise reacting propylene or certain hydrocarbyl-substituted propylenes with sulfur or compounds capable of liberating sulfur, e.g., inorganic polysulfides, at temperatures of about 175° C.–225° C. to produce relatively low yields of trithione product. For example, Luttringhaus et al., Ann., 560, 201 (1948), describe the reaction of propylene with sulfur at 175° C.–220° C. to produce an approximately 1% yield of trithione.

An improved method for the production of relatively simple hydrocarbon trithiones is disclosed in the copending U.S. application of Hodgson, Ser. No. 443,617 filed Mar. 29, 1965, now matured to U.S. 3,345,380. According to the disclosure of this co-pending application, improved yields of certain trithiones are obtained when a propylene is contacted with elemental sulfur at an elevated temperature.

Greater difficulty is attendant to the production of trithiones containing one or more non-hydrocarbyl substituent(s). Under the vigorous reaction conditions required for efficient production of trithiones, many non-hydrocarbyl substituents are cleaved from the reactant molecule so that the resulting trithione product does not incorporate the non-hydrocarbyl substituent. For example, reaction of a 1-chloropropene with sulfur under the conditions described in the above-identified copending application results in the loss of the chlorine and the formation of a 5-chlorotrithione is not observed.

It is an object of the present invention to provide an improved process for the production of certain non-hydrocarbyl substituted trithiones. More particularly, it is an object to provide an improved process for the production of trithiones incpororating certain non-hydrocarbyl substituents on the number 4 ring atom.

It has now been found that these objects are accomplished by intimately contacting elemental sulfur and an organic reactant comprising an otherwise hydrocarbon three-carbon moiety which is substituted on the internal carbon atom thereof with a non-hydrocarbyl electron-withdrawing substituent, in the vapor phase at an elevated temperature. Employing the particularly substituted reactants of the invention, relatively high yields of the correspondingly substituted trithione products are observed with comparatively little substituent cleavage.

The organic reactant of the invention comprises a non- to monoethylenically unsaturated acyclic three carbon moiety, i.e., a propane or a propene, substituted on the number 2 atom thereof with a non-hydrocarbyl electron-withdrawing substituent. By the term "electron-withdrawing group" is meant a group which, when attached to an aromatic ring, is considered to be ring-deactivating. Illustrative of such electron-withdrawing groups are halogen, cyano, trihalomethyl, carboxy, carboalkoxy, acyl, formyl and nitro. One class of such reactants comprises a class of compounds having up to 6 carbon atoms represented by the formula

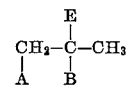

where A and B are hydrogen or such that together they form an additional bond between the carbon atoms to which they are attached and E is an electron withdrawing substituent as defined above. Illustrative of reactants of this class are 2-chloropropene, 2-bromopropane, methyacrylonitrile, 2-cyanopropane, 2-(trichloromethyl) propane, 2-(trifluoromethyl)propene, methacrylic acid, 2-nitropropane, ethyl methacrylate, methyl isobutyrate, methacrolein, methyl isopropyl ketone, ethyl isopropenyl ketone, 2-iodopropane, 2-fluoropropene and isobutyric acid. In general, compounds of the above formula which are ethylenically unsaturated are preferred over analogous saturated reactants and particularly preferred are the 2-substituted popylenes wherein the substituent is halogen, particularly halogen of atomic number from 9 to 35 inclusive, i.e., fluorine, chlorine or bromine; trihalomethyl, particularly trihalomethyl wherein each halogen independently is halogen of atomic number from 9 to 35 inclusive; cyano or carboxy.

The above-depicted organic reactant is contacted with elemental sulfur in the vapor phase at elevated reaction temperature. Although the process is adaptable for a batch-type operation, the efficiency of the process allows short reaction times to be employed and the process is most suitably conducted in a continuous manner as in a continuous flow reactor. In one modification the organic reactant and sulfur are mixed prior to or simultaneously with introduction into a reaction zone. In this modification, best results are obtained when the reactants have been preheated and are in the vapor phase at the time of mixing. It may also be desirable to employ an inert carrier gas such as nitrogen, argon, helium, steam or the like to facilitate passage of the reaction mixture through the reactor.

In an alternate modification, the sulfur is formed in situ as by reaction of hydrogen sulfide and sulfur dioxide. In this modification a two-stage reactor is typically employed, the first stage of which is utilized for sulfur generation and the gaseous sulfur therein produced is passed to the second stage wherein it is contacted with the organic reactant to effect production of the desired 4-substituted trithione. Hydrogen sulfide and sulfur dioxide are introduced into the initial reaction zone which is preferably packed with particulate solid material, e.g., alumina, silica, crushed brick, glass helices or the like to promote a more even heat transfer and provide surface. The gaseous reactants are maintained at an elevated temperature, e.g., from about 400° C. to about 450° C., during passage through the sulfur generation zone to promote a more rapid rate of sulfur formation and to maintain the sulfur product in the vapor phase. In such an in situ production of sulfur, the hydrogen sulfide and the sulfur dioxide are employed in any convenient ratio. No apparent advantage arises from utilization of other than stoichiometric amounts, and the use of stoichiometric proportions, i.e., a molar ratio of hydrogen sulfide to sulfur dioxide of abut 2:1, is preferred. The situ production of sulfur is conducted at any convenient pressure and pressures from about 0.5 atmosphere to about 5 atmospheres are satisfactory. As previously stated, the effluent from the initial reaction zone wherein the sulfur is produced is suitably directly passed to a second reaction zone wherein the sulfur is contacted with the organic reactant. It should be appreciated that in the above in situ formation of sulfur, water is also formed as a product. The presence of water in the reaction zone wherein the sulfur and the organic reactant are to be contacted does not appear to be overly detrimental and in most cases it is not necessary to remove the water from the initial reaction zone effluent before contacting the effluent and the organic reactant. If desired, however, water may be removed from the initial reaction zone effluent as by conventional drying means.

Largely because of the availability of elemental sulfur and the relatively low cost thereof, the modification wherein sulfur is employed directly is preferred over the modification wherein sulfur is produced in situ.

Regardless of the manner of sulfur provision, it is generally preferred to employ a molar excess of the sulfur over the organic reactant. The optimum amount of sulfur to be employed will in part depend upon the type of three-carbon moiety that is present, i.e., whether the organic reactant is a 2-substituted propane or a 2-substituted propene. A stoichiometric consideration of the reaction would predict the necessity of employing 5 gram-atoms of sulfur for each mole of 2-substituted propene and 6 gram-atoms of sulfur for each mole of 2-substituted propane. However, it is on occasion desirable to employ ratios of gram-atoms of sulfur to moles of organic reactant as low as about 2:1 to as high as about 12:1. Ratios of gram-atoms of sulfur to moles of organic reactant from about 3:1 to about 8:1 are preferred.

The temperature at which the sulfur and the organic reactant are contacted has been found to be of some importance when good yields of 4-substituted trithione product are desired, as the use of a reaction temperature that is too low results in an unnecessarily low conversion of organic reactant whereas utilization of a reaction temperature that is too high results in a diminution of selectivity to trithione product which is not compensated by the increased conversion obtained so that the yield of the desired trithione product is effectively decreased. Best results are obtained when a reaction temperature from about 450° C. to about 600° C. is employed with particularly satisfactory results being obtained by utilizing reaction temperatures from about 457° C. to about 550° C.

The efficiency of the present process is not dependent upon utilization of any particular reaction pressure except insofar as the pressure at which the reactants are introduced to the reaction zone will influence the residence time and hence the reactant contact time in a reaction zone of any given volume. Little advantage is obtained by employing pressures other than about atmospheric pressure and the reaction is preferably conducted at a substantially atmospheric pressure, that is, a pressure from about 0.5 atmosphere to about 5 atmospheres. Utilizing such pressures, reactant contact times of from about 0.5 second to about 8 seconds are obtainable in a reaction zone of moderate size and such reactant contact times are satisfactory. Preferred, however, are reactant contact times of from about 1 second to about 5 seconds.

Subsequent to reaction, the effluent from the reaction zone is customarily at least partially condensed to provide a product mixture from which the desired trithione product is separated and recovered by conventional means such as fractional distillation, fractional crystallization, selective extraction, chromatography or the like.

The trithione products of the process of the invention comprise a five-membered unsaturated heterocyclic ring containing two adjacent sulfur atoms and containing the electron-withdrawing substituent of the organic reactant as a substituent on the number 4 ring atom. In terms of the preferred organic reactants as defined above, the trithione product is represented by the formula

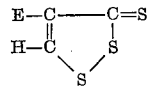

wherein E has the previously stated significance. Illustrative products include 4-chlorotrithione, 4-cyanotrithione, 4-fluorotrithione, 4-(trifluoromethyl)trithione and 4-carboxytrithione.

The trithione products of the invention find utility as chemical intermediates, particularly in the production of agricultural products, e.g., herbicides, and are useful as antioxidants, corrosion inhibitors and extreme pressure additives in lube oils and the like.

To further illustrate the improved process of the invention the following examples are provided. It should be understood that the details thereof are not to be regarded as limitations, as they may be varied as will be understood by one skilled in this art.

Example I

A run was conducted wherein 2-chloropropene was reacted with sulfur to produce 4-chlorotrithione. The apparatus employed was a two-stage vycor reactor of approximately 100 ml. volume in each stage. The stages were thermally independent and each was heated in a vertically-mounted furnace. Molten elemental sulfur together with nitrogen carrier gas was introduced into the first stage maintained at 500° C. where the sulfur was vaporized. The gaseous effluent from this stage was passed to the second stage where it was mixed with 2-chloropropene and additional nitrogen. The effluent from the second stage was passed to an unheated trap where most of the trithione product was collected. The trithione product carried over by the gas stream was recovered by scrubbing with benzene which was then removed by distillation under reduced pressure. The trithione product was recovered from the combined trap and scrubber products by fractional crystallization.

In this run, sulfur and 2-chloropropene were contacted in a molar ratio of 4.1:1 at a temperature of 500° C. for a contact time of 2–3 seconds. The yield of 4-chlorotrithione, M.P. 141–142° C., was 15% based on the 2-chloropropene. The product had the following elemental analysis.

*Analysis.*—Calcd. weight: C, 21.4%; H, 0.59%; Cl, 21.0%; S, 56.9%. Found: C, 21.2%; H, 0.5%; Cl, 20.6%; S, 56.4%.

The identity of the product was confirmed by mass spectrometric analysis and the nuclear magnetic resonance spectrum was consistent with the above structure.

Example II

When 1,2-dichloropropene was reacted with elemental sulfur according to the procedure of Example I, employing a molar ratio of sulfur to 1,2-dichloropropene of 5.5:1, a reaction temperature of 500° C. and a contact time of 2–3 seconds, the sole observable trithione product was 4-chlorotrithione obtained in 44% yield, thereby evidencing extensive cleavage of the 1-chloro substituent of the propene reactant and relatively little cleavage of the 2-chloro substituent.

Example III

The procedure of Example I was followed to contact elemental sulfur and methacrylonitrile employing a molar ratio of sulfur to methacrylonitrile of 4.2:1, a reaction temperature of 510° C. and a contact time of 2–3 seconds.

The product 4-cyanotrithione, M.P. 183–184.5° C., believed to be a novel compound, was obtained in greater than 19% yield. The product had the following elemental analysis.

*Analysis.*—Calcd. weight: C, 30.2%; H, 0.6%; N, 8.8%. Found: C, 27.8%; H, 0.7%; N, 8.6%.

The identity of the product was confirmed by mass spectrometric analysis and the nuclear magnetic resonance spectrum was consistent with the above formula.

Example IV

The procedure of Example I was followed to contact elemental sulfur and methacrylic acid in a molar ratio of 4.5:1 at a temperature of 550° C. and a contact time of 2–3 seconds. 4-Carboxytrithione was obtained.

Example V

The procedure of Example I was followed to contact elemental sulfur and 2-fluoropropene in a molar ratio of 6:1, at a temperature of 550° C. employing a contact time of 2–3 seconds. The product 4-fluorotrithione, M.P. 125–126° C. was obtained in a yield of 46%. The product had the following elemental analysis.

*Analysis.*—Calcd. weight: C., 23.7%; H, 0.7%; F, 12.5%; S, 63.2%. Found: C, 23.7%; H, 0.9%; F, 10.9%; S, 61.5%.

The identity of the product was confirmed by mass spectrometric analysis and the nuclear magnetic resonance spectrum was consistent with the above formula.

Example VI

The procedure of Example I was followed to contact elemental sulfur and 2-(trifluoromethyl)propene in a molar ratio of 6:1, at a temperature of 550° C. employing a contact time of 2–3 seconds. The product, 4-(trifluoromethyl)trithione, M.P. 82–83° C., believed to be a novel compound, was obtained in 46% yield. The product had the following elemental analysis.

*Analysis.*—Calcd., weight: C, 23.8%; H, 0.5%; F, 28.2%. Found: C, 24.9%; H, 0.8%; F, 27.0%.

The identity of the product was confirmed by mass spectrometric analysis and the nuclear magnetic resonance spectrum was consistent with the above structure.

Similar results are obtained when 2-(trifluoromethyl)-propane is employed as the organic reactant in place of the 2-(trifluoromethyl)propane of the above example.

We claim as our invention:

1. The process of producing a 4-substituted trithione product which comprises intimately contacting (a) the 2-substituted $C_3$ compound of up to 6 carbon atoms of the formula

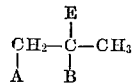

wherein A and B are hydrogen or such that together they form an additional bond between the carbon atoms to which they are attached and E is an electron-withdrawing substituent, and (b) from about 2 gram-atoms to about 12 gram-atoms of sulfur per mole of said $C_3$ compound, in the vapor phase at a temperature of from about 450° C. to about 600° C., the time of said contacting being from about 0.5 second to about 8 seconds.

2. The process of claim 1 wherein the A and B moieties of said $C_3$ compound form an additional bond between the carbon atoms to which they are attached.

3. The process of claim 2 wherein from about 3 gram-atoms to about 8 gram-atoms of slufur are employed per mole of said 2-substituted $C_3$ compound.

4. The process of claim 2 wherein the E substituent of said 2-substituted $C_3$ compound is halogen, trihalomethyl, cyano or carboxy.

5. The process of claim 4 wherein the E substituent is cyano.

6. The process of claim 4 wherein the E substituent is halogen of atomic number from 9 to 35 inclusive.

7. The process of claim 6 wherein the halogen is chlorine.

8. The process of claim 4 wherein the E substituent is trihalomethyl wherein each halogen independently is halogen of atomic number from 9 to 35.

9. The process of claim 8 wherein the trihalomethyl substituent is trifluoromethyl.

References Cited

UNITED STATES PATENTS 2,688,620   9/1954   Gaudin _____ 260—327

JAMES A. PATTEN, *Primary Examiner.*